(12) United States Patent  
Jin et al.

(10) Patent No.: US 6,577,430 B1
(45) Date of Patent: Jun. 10, 2003

(54) BI-DIRECTIONAL OPTICAL SWITCH

(75) Inventors: Guanghai Jin, 13 Henshaw St., Woburn, MA (US) 01801; Lei Zhang, Acton, MA (US); Jing Zhao, Winchester, MA (US)

(73) Assignee: Guanghai Jin, Woburn, MA (US)

( * ) Notice: Subject to any disclaimer, the term of this patent is extended or adjusted under 35 U.S.C. 154(b) by 62 days.

(21) Appl. No.: 09/853,713

(22) Filed: May 14, 2001

(51) Int. Cl.[7] .............................. G02F 1/09; G02F 1/00; G02B 6/26
(52) U.S. Cl. ..................... 359/280; 359/281; 359/320; 359/324; 359/484; 385/16; 385/22; 385/11; 385/18; 343/756
(58) Field of Search .................... 359/280, 281, 359/283, 285, 288, 302, 320, 322, 324, 484; 385/11, 16, 22, 33, 43, 18; 343/756

(56) References Cited

U.S. PATENT DOCUMENTS 3,787,869 A * 1/1974 Charlton et al. ............ 343/756
4,355,864 A * 10/1982 Soref ............................ 385/18
4,969,720 A * 11/1990 Lins et al. .................... 359/302
6,118,910 A *  9/2000 Chang .......................... 385/16
6,134,031 A * 10/2000 Nishi et al. .................. 359/320
6,438,278 B1 *  8/2002 Liu et al. ...................... 385/11

* cited by examiner

Primary Examiner—Loha Ben

(57) ABSTRACT

The present invention provides improved optical switches in which no mechanical movement is required to direct optical pathways between plural fiber ports and light transmission is bi-directional. Advantageously, the inventive switches permit bi-directional light transmission. The inventive switches also incorporate light bending devices to allow two fibers to be coupled to the light beams using a single lens for compactness. In the inventive switch, an optical signal is spatially split into two polarized beams by a birefringent element, which passes through a polarization rotation device that comprises waveplates, walk-off elements, and an electrically controllable polarization rotator, and recombine into an output fiber, achieving polarization independent operation. The switches of the present invention rely on electromagnetically or electro-optically switching the beam polarizations from one state to another to rapidly direct the light path.

7 Claims, 6 Drawing Sheets

BI-DIRECTIONAL OPTICAL SWITCH

BACKGROUND OF THE INVENTION

1. Field of the Invention

The present invention is related to optical devices; more particularly, the invention relates to non-mechanical optical switches.

2. Description of Related Art

Optical switch is a device for directing optical signals along selected fibers of an optical network, in which light signals are transmitted along optical fibers to transfer information from one location to another. The desirable optical switch performance include: high speed switching, bi-direction operation, low optical insertion loss, long operation lifetime, small size, and low cost. Optical switch is a key component in today's optical network, analogous to the electrical switches in electrical networks. However, it has not been widely adopted because its lack of reliability and its high cost associated with its fabrication difficulty.

In an optical switch, light signal must be accurately entered into an optical fiber, or much of the signal strength will be lost. The alignment requirements of modem single mode optical fibers are particularly stringent, as their core diameters are typically as small as 2 to 10 micrometers and their acceptance angle is fairly narrow. Additional insertion losses reduce the amplitude of the optical signal. Therefore, optical switches which accept light from an input optical fiber, and which selectively couple that light to any of a plurality of output optical fibers must transfer that light with precise alignment and within the small acceptance angle for light to efficiently enter the fiber. Most prior art optical switches are based on mechanical movement to switch light beams, consequently have drawbacks of slow and less reliable. It is greatly desirable to have optical switches that direct light beams without moving parts, a feature generally associated with high reliability and high speed.

Many types of alternative none-mechanical optical switches have been developed for commercial applications, such as thermal heating, electro-optic phase retardation, and magneto-optic polarization rotator. These devices use various materials and configurations. Thermal heating based switches typically rely on long interaction thin film waveguide construction (for example U.S. Pat. No. 5,892,863). This type of switch has a deficiency of large insertion loss due to fiber to thin film waveguide coupling. On the other hand, micro-optic assembly generally provides low optical loss. Presently, the dominant low loss electro-optic switches are based on organic liquid crystal materials. This type of device, consequently, has undesirable properties of slow operation at low temperature and electrodes in the light path (for example U.S. Pat. No. 4,917,452).

Among non-mechanical optical devices, oxide crystal materials such as magneto-optic and electro-optic based micro-optic devices are particularly attractive. Inorganic materials are generally preferred than organic materials in optical network devices, due to their excellent stability. Optical switches based on magneto-optic crystals have been described in several patents, as referenced in this disclosure. However, all known magneto-optic switch designs are limited to transmit light only in one direction. This deficiency hampers their applications in today's optical networks, which are often bi-directional. Moreover, due to their complex configurations, conventional optical switches also suffer from high insertion loss and high cost. Further, these switches often comprise many elements and require extremely stringent alignment that is unsuitable for manufacture. Therefore, magneto-optic based optical switches have not been widely used in optical communications.

An early concept of a magneto-optic crystal based optical switch for telecommunication use was disclosed by Jin, U.S. Pat. No. 5,627,924. The switch is a modification of optical circulator thus has a drawback of non-reciprocal operation. In Jin's switch, the optical beams from the two ports on the same side propagate desirably parallel but with a relative large spatial location shift. This design requires three individual imaging lenses, or three fiber collimators. A fiber collimator is a component consists a collimating lens packaged together with light guiding fibers. Because of the large beam separations between the two adjacent lenses, the design requires large and long crystals to deflect the beams. As a result, the optical device typically has large loss, excessively large size, and is expensive to produce.

Recent version as described by Shirasaki U.S. Pat. No. 5,982,539 represents some improvement by using dual fiber sharing a single imaging lens to reduce the optical device size. However, Shirasaki switch is a non-reciprocal device, which is unsuitable for modern bi-directional communication applications. Another disadvantage of Shirasaki switch is that the beam propagations are no long parallel rather with an angle. Consequently the switch demands precise fabrication of polarization prisms and matching birefringent wedges. This switch also requires delicacy for maintaining accurate alignment of each optical path, in which the angular and the spatial positions are closely interrelated. Therefore, manufacturing of Shirasaki switch is difficult.

Recent switches as described by Bergman, U.S. Pat. No. 5,923,472 and U.S. Pat. No. 6,173,092B1 and Robinson, U.S. Pat. No. 5,933,269 all utilize mirrors to reflect the beam back to another port on the same side. With a long and fold beam propagation and an unsymmetrical geometry, the devices become less tolerance to both extremely small angle and position misalignment. This type of switch is therefore often very difficult and costly to make. Moreover, the design is a non-reciprocal device.

For the above reasons, what is needed is a system and method for providing non-mechanical optical switches that is bi-directional in light transmission and amenable to volume production. It would be particularly desirable to provide optical switches having low optical insertion loss and high speed switching that is also reliable, but which use less components of small size and require reduced alignment steps with large assembly tolerance to facilitate low cost manufacture.

SUMMARY OF THE INVENTION

It is an object of the present invention to provide a Faraday rotator assembly in which polarization rotation can be electrically controlled between 0° and 90°, forming a base for bi-directional devices. It is another object of the present invention to provide a compact and economical non-mechanical optical switch that can be efficiently coupled to optical fibers. The invention consists of optical switches having at least three ports for optical fibers. The inventive switches use at least one single lens to coupling two fibers for compactness. The invention further consists of a light-bending device, situated to compensate for the angle between the two light beams that share the same lens, advantageously increasing alignment tolerance.

BRIEF DESCRIPTION OF THE DRAWINGS

FIGS. 3A and 3B are a top view and side view of the inventive switch, respectively. FIG. 3C depicts the polarization after particular components as the optical signal travels along the two optical paths, in accordance with the invention.

FIG. 4A is a structure view of glass prism. FIG. 4B is a structure view of Wollaston prism. FIG.4C is a structure view of Rochon prism.

FIGS. 5A and 5B are a top view and side view of the inventive switch, respectively. FIG. 5C depicts the polarization after particular components as the optical signal travels along the two optical paths, in accordance with the invention.

FIGS. 6A and 6B are a top view and side view of the inventive switch, respectively. FIG. 6C depicts the polarization after particular components as the optical signal travels along the two optical paths, in accordance with the invention.

DETAILED DESCRIPTION OF THE SPECIFIC EMBODIMENTS

The polarization insensitive solid-state optical switch of this invention has several advantages over prior non-mechanical optical switches. First, the inventive reciprocal Faraday rotator 14 enables light beam to propagate in both directions. The embodiment of the inventive switch is a reciprocal optical device, which advantageously allows bi-directional communications. Conventional magneto-optic switches are all limited to non-reciprocal operation. Second, the two optical ports on the same side are placed next to each other and share the same imaging element. Only one lens is used on each side of the switch, leading to fewer optical elements and a smaller footprint. Conventional optical switches have an arrangement wherein each optical port has its own individual imaging element. Third, the incorporation of a beam angle correction system 20 compensates for the angle separation between the two beams from the same imaging lens (dual collimator consisting fiber 2 and fiber 3). The advantage of having an angular tuning element is that it substantially allows to adjust position and angular independently to achieve maximum light coupling. This inventive configuration greatly reduce the packaging difficulty, therefore, is particularly desirable for volume production. The inventive optical switch's increased alignment tolerance further provides substantially improvement in device thermal stability. Fourth, another advantage of the inventive optical switch accrues because of the inventive switch's symmetrical crystal layout. Consequently, this provides a symmetric beam path for two polarization components from each port, leading to much reduced, or even substantially eliminated, polarization mode dispersion.

In one aspect of the invention, an optical signal may be rapidly and reliably switched between two optical paths. The inventive optical switch may be used in telecommunications systems/sub-systems, such as in WDM's, EDFA's, add-drop multiplexers, dispersion compensators, network switches, network protection and restoration, and OTDR's. These and other advantages of the inventive optical switches are elaborated in the specific embodiments now described. The inventive optical switch may also be used in other optical networks, such as sensors and computers.

Figure 1:
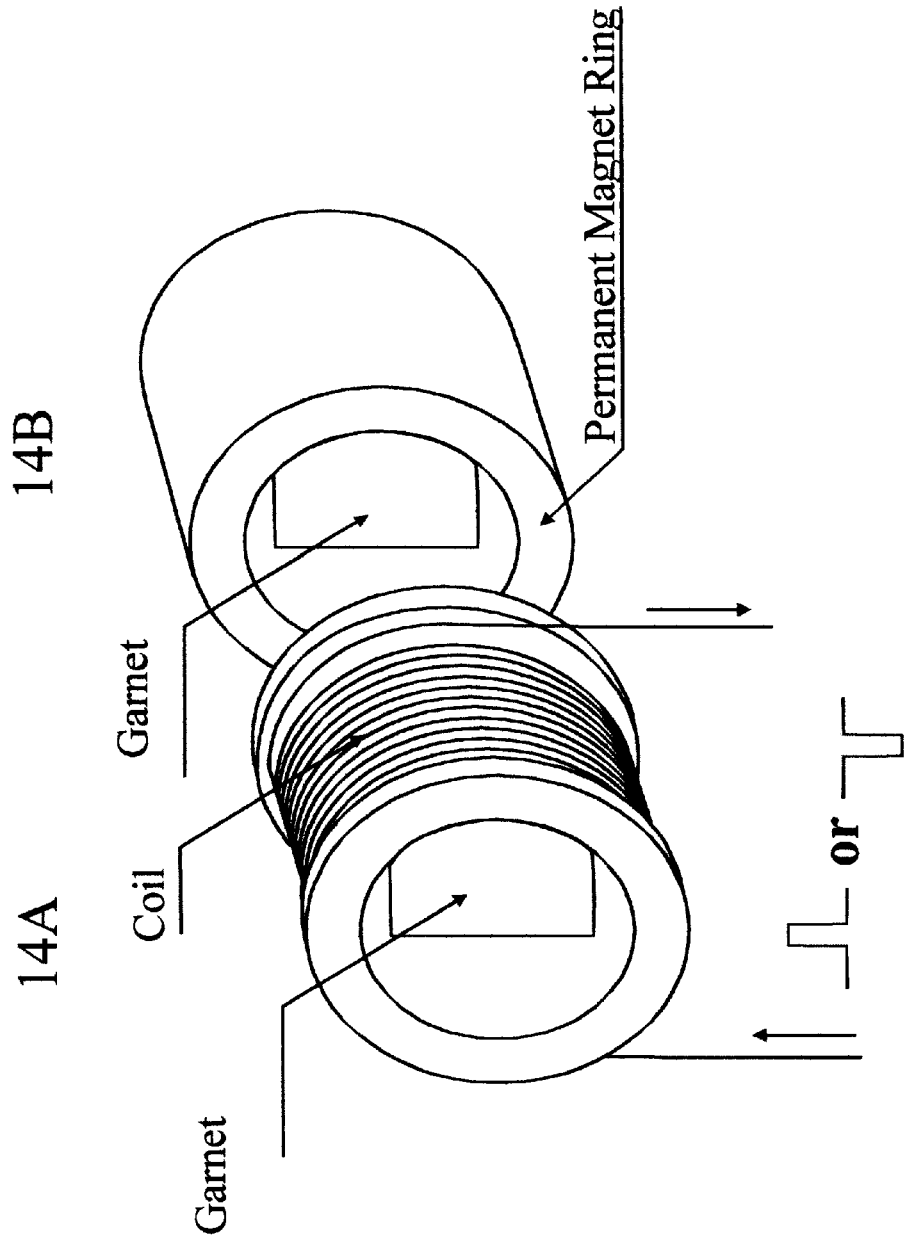
FIG. 1 is a schematic view of an embodiment of the reciprocal Faraday rotator according to the present invention.

FIG. 1 schematically depicts a generic view of an inventive reciprocal Faraday rotator that comprises two rotators. The first garnet is coupled to an electromagnet with the magnetic field parallel to the light beam, forming an electrically controllable thus reversible Faraday rotator 14A. With a proper garnet thickness, 14A rotates the polarization of passing light by 45° clockwise or counterclockwise, respectively, by changing the polarity of the applied control voltage. The second Faraday rotator 14B comprises either a latched garnet or a garnet that is field saturated by a permanent magnet with the magnetic field parallel to the light beam. Faraday rotator 14B rotates the light beam polarization by 45° of a fixed direction. Therefore, the combined Faraday rotator 14 rotates light polarization between 0° when the two polarization rotations of 14A and 14B cancel each other and 90° when the two rotations are in the same direction by varying the control signal. Although other optical element could be placed between Faraday rotator 14A and Faraday rotator 14B, the net effect of rotating light beam polarization between 0° to 90°, achieved by the inventive Faraday rotator 14, forms the base for reciprocal devices.

In a preferable embodiment, the Faraday polarization rotator 14A comprises yttrium-iron-garnet (YIG), or Bi-added thick film crystals with a low field of saturation, such as less than 200(Oe) to reduce power consumption. One example of such materials is bismuth-substituted rare earth iron garnet single crystal system represented by a chemical formula $(GdRBi)_3(FeGaAl)_5O_{12}$, where R denotes at least one element selected from the group consisting of yttrium (Y), ytterbium (Yb) and lutetium (Lu). The electromagnet coupled to Faraday rotator 14A comprises primarily copper coils. Ion alloys are often incorporated into the electromagnet to improve electrically induced magnetic field strength. Semi-hard magnetic metallic alloys can be used to achieve latching performance, although this is not essential for self-latching type garnets. Therefore, the inventive switch requires only current pulse to switch optical path from one to another and latches to the previous switching state even when the current is removed.

Several specific embodiments of bi-directioral fiber optical switches based on the inventive reciprocal Faraday rotator 14 are described in the following sections.

Figure 2:
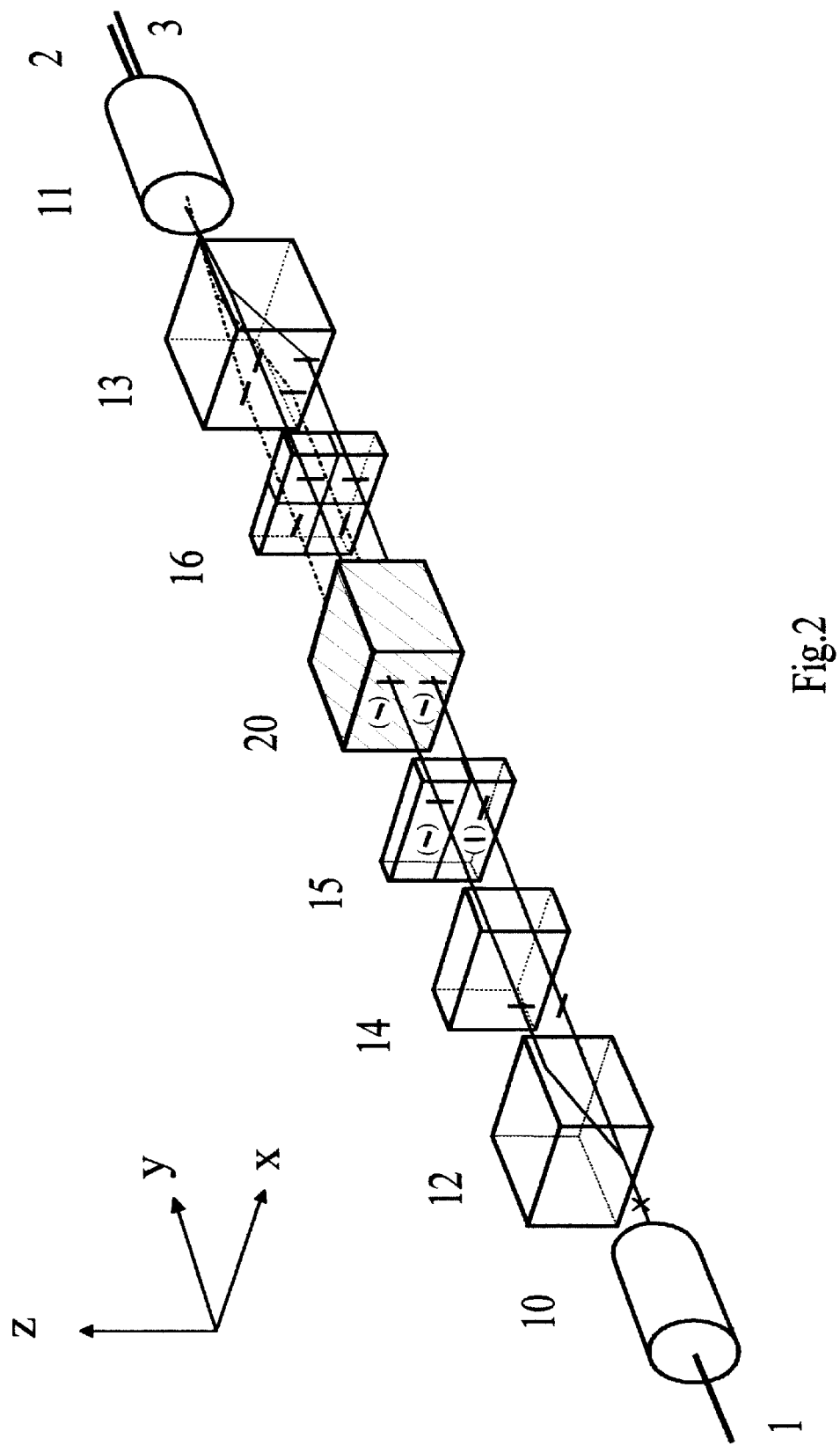
FIG. 2 is a schematic view of a non-mechanical 1×2 switch according to the principles of the present invention.

FIG. 2 schematically depicts a generic view of a 3 ports inventive non-mechanical optical fiber switch. The invention relates to an optical switch comprising several optical components which are optically coupled along the longitudinal axis: a first beam displacer/combiner 12 that displaces at least one optical beam into two polarized component beams and combines at least two polarized component beams to form an optical beam; an electrically controllable rotator 14, for rotating the polarization orientation of the polarized component beams upon an electrical signal to direct beam between two paths; a first half-aperture half-wave plate 15, for rotating the polarization of the beams such that both beams have the same polarization state; a polarization walk-off and beam angle deflection system 20 which shifts one set of the polarization beam laterally the same distance and deflect all beams with a correction angle, such that both optical path are coupled into the dual collimators that have an angular between the two beam propagations; a second diagonal half-aperture halfwave plate 16 for rotating the polarization of the beams such that the two beams have orthogonally polarized states; and a second beam displacer/combiner, that displaces at least one optical beam into two polarized component beams and combines at least two polarized component beams to form one optical beam. The switch described here is a polarization-rotation based device in which the light beam with a certain state of polarization goes to one fiber but that with another state of polarization goes into another fiber. The electrically controlled polarization rotator switches the state of polarization of input light from one to another, consequently switches light from one port to another port.

The present invention will be further described in terms of several optical switch embodiments having specific components and having a specific configuration. However, one of ordinary skill in the art will readily recognize that this method and system will operate effectively for other components having similar properties, other configurations, and other relationships between components.

To more particularly illustrate the method and system in accordance with the present invention, refer now to FIGS. 3A, 3B, and 3C, depicting one embodiment of a three ports (1×2) optical switch using Faraday rotator. FIG. 3A depicts a top view of the optical switch. FIG. 3B depicts a side view of the optical switch. FIG. 3C depicts the propagating beams's polarization states as they exit each component. A first optical fiber 1 is inserted into a first glass capillary 10A. Opposite first fiber 1, a second optical fiber 2 is inserted into a second glass capillary 11A and a third optical fiber 3 is inserted into the same glass capillary 11A adjacent to fiber 2, so that fiber 2 and fiber 3 are parallel. Fiber 1 emits a light beam 30 that is collimated by lens 10B. Light beam to or from fiber 2 and fiber 3 are collimated by lens 11B. Lens 11B also causes beam to make an angle θ with respect to the y-axis.

Beam 30 then passes through a first birefringent block 12. Beam 30 is thereby divided into two beams having orthogonal polarizations, specifically beams 30A and 30B; these polarizations are indicated in FIG. 3C. The length of birefringent block 12 is adjusted to obtain a spatial separation between beams 30A and 30B, which permits to pass them through independent optical elements.

Figure 3:
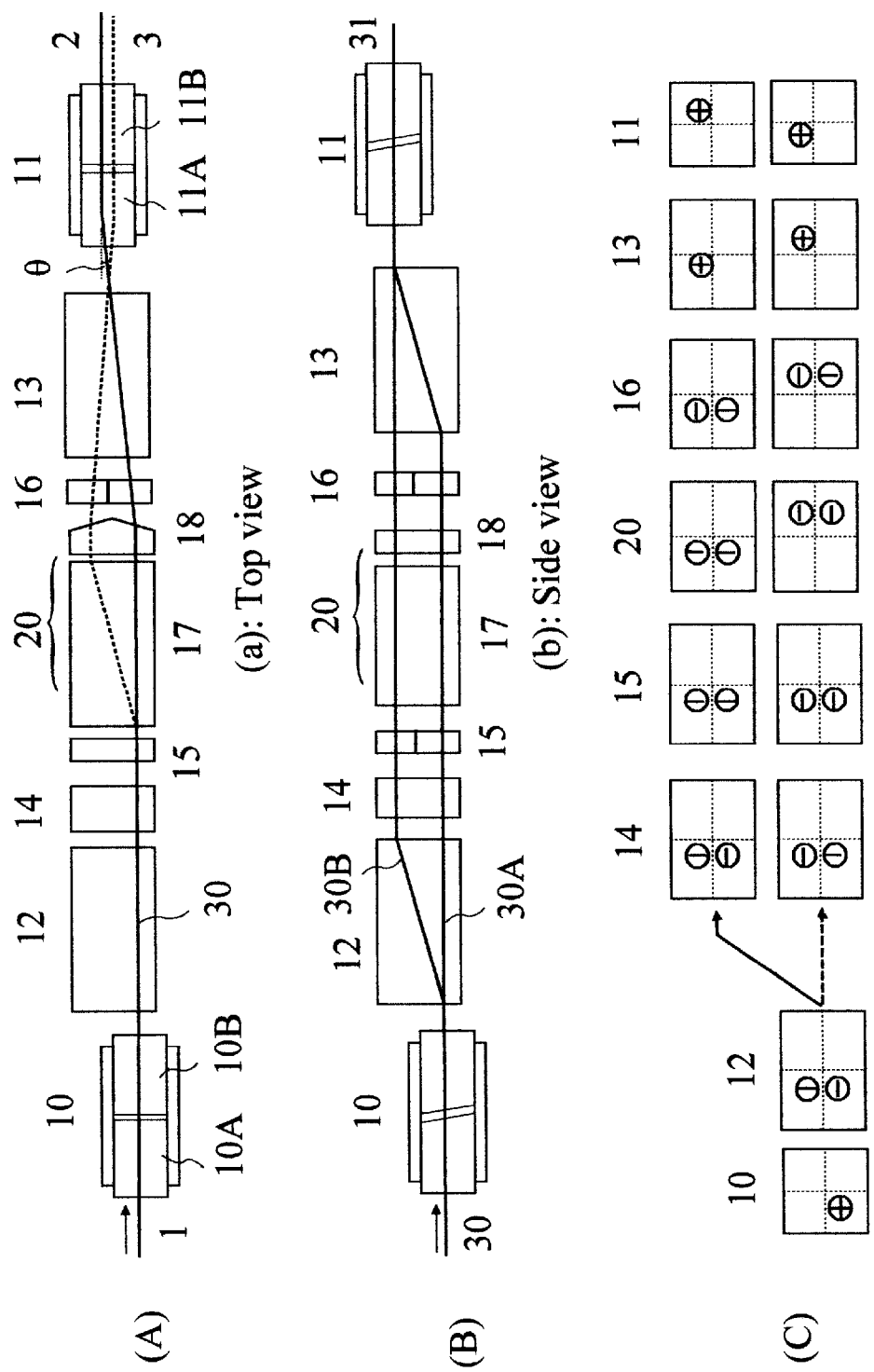
FIG. 3 is a plan view of a specific non-mechanical optical switch of FIG. 2, and illustrates the arrangement of each element within the switch body for this embodiment.

Considering a first switching state in which light path is from 1 to 2, as indicated by solid beam propagation line in FIG. 3. In this light path sate, beam 30A and beam 30B enter an electrically controllable Faraday polarization rotator 14 which rotates the plane of polarization by 0°, as seen in the top section of FIG. 3C, by applying a current pulse flowing in the direction in which the polarization rotations of 14A and 14B are opposite to each other. 30A then enters a first halfwave plate 15 which rotates the plane of polarization by 90°. The net effect of halfwave plate 15 and Faraday rotator 14, therefore, is to render the two polarizations beams 30A and 30B in the vertical Z direction. The beam 30A and 30B then pass a birefringent walk-off element 17 unaltered.

At this point both beams propagate parallel to the longitudinal y-axis which need to be bent at an angle θ with respect to the y-axis in order to be efficiently coupled into fiber 2. A polarization-independent light-bending device 18 corrects this angle of propagation. Therefore, light-bending device 18 plays an important role in guiding light from fiber 1 to fiber 2.

Beam 30A then enters a halfwave plate 16, which rotates the plane of polarization of beam 30A by 90°. Beams 30A and 30B subsequently pass through a second birefringent block 13, where beam 30A is the extraordinary ray and beam 30B is ordinary. Block 13 combines beams 30A and 30B to form a single beam 31 that is in general unpolarized since it combines the two orthogonal polarizations of beams 30A and 30B. Beam 30 is focused by a second lens 11B and enters optical fiber 2 mounted in glass capillary 11A. Therefore an optical path from fiber port 1 to fiber 2 is established, when Faraday rotations are cancel each other by applying a corresponding electrical current.

Next, considering a second switching state in which light path is from port 1 to port 3, as shown in FIG. 3 by the dotted beam propagation line. Similarly, fiber 1 emits a light beam 30 that is collimated by lens 10B. After passing through birefringent block 12, beam 30 is divided into two orthogonally polarized beams 30A and 30B. Then, beam 30A and beam 30B enter the Faraday polarization rotator 14, which rotates polarization by 90°, by applying a current pulse opposite to the first switching state so that the two polarization rotations are the same. 30A then enters a first halfwave plate 15 which rotates the plane of polarization by 90°. The net effect of halfwave plate 15 and Faraday rotator 14, therefore, is to rotate the polarzations of both beams 30A and 30B parallel to each other in the horizontal X direction. The beam 30A and 30B then pass a birefringent walk-off element 17 and change propagation with a displacement in x-axis. Beams 30A and 30B are then bended at angle 0 with respect to the y-axis by glass prism 18.

Next, beam 30B enters a halfwave plate 16, which rotates its plane of polarization by 90°. Block 13 subsequently combines beams 30A and 30B to form a single beam that is focused by lens 11B on optical fiber 3. Therefore an optical path from fiber 1 to fiber 3 is established, as a 90° Faraday rotation is applied to the switch.

Walk-off element 17 can be made using birefringent crystal or polarization prism.

One preferred embodiment of device 18 consists of a tapered glass prism, whose angle is adjusted so that beams enter from fiber port 2 or 3 are rendered parallel to the y-axis as the beams exit device 18. One specific embodiment of glass prism is illustrated in FIG. 4A. Other shapes and constructions of prisms can also perform the same function.

In another preferable embodiment, the light guiding device 18 can be constructed using two tapered birefringent plates 18A and 18B from the same birefringent material to change angle of propagation. Two such examples of Wollaston type and Rochon type prisms are depicted in FIG. 4B and FIG. 4C. The tapering of the first plate 18A is complementary to the tapering of the second plate 18B, and each plate is tapered by an angle α. The index of refraction in general determines how much a light ray will bend, or refract, upon entering a material When the index of refraction is known, the amount of refraction can be determined by Snell's law. The angle α is adjusted so that beams 30A and 30B are rendered parallel to the y-axis by light guiding device 18, when light beam inputs from port 2 or port 3.

Figure 4:
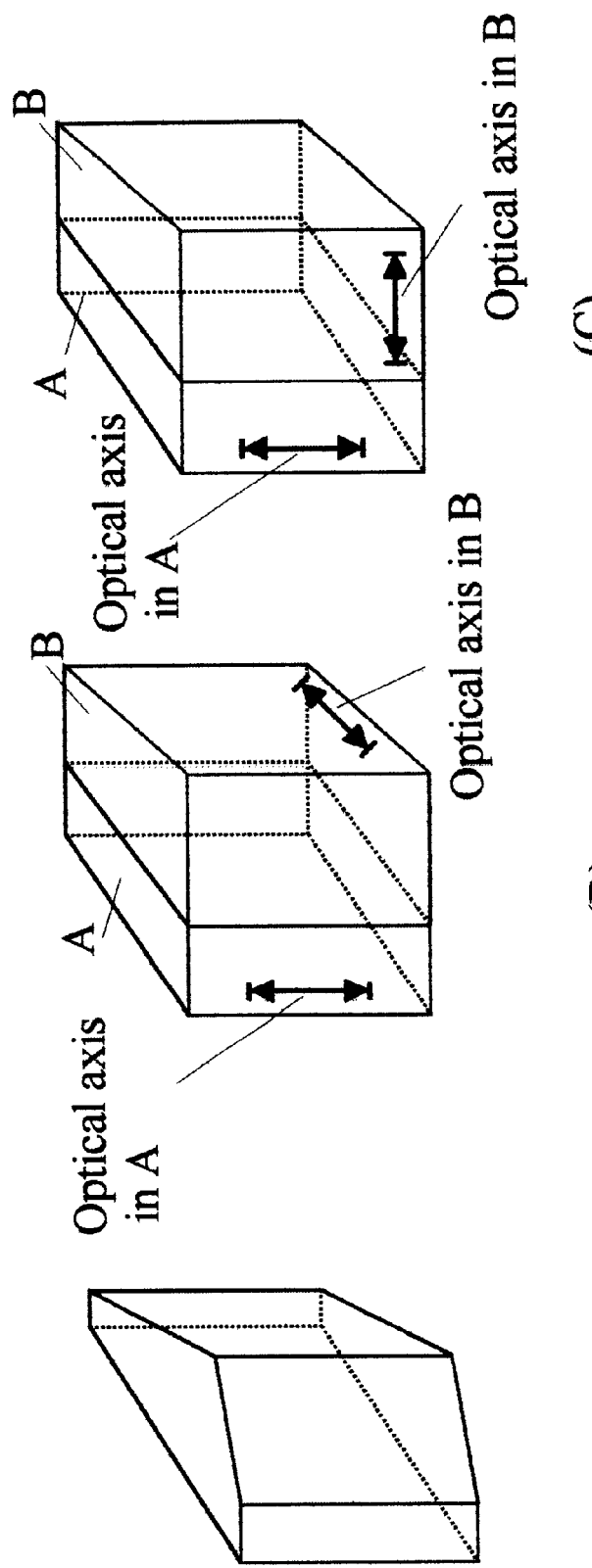
FIG. 4 shows three embodiments of angle correction prism 18, in accordance with the invention.
Figure 5:
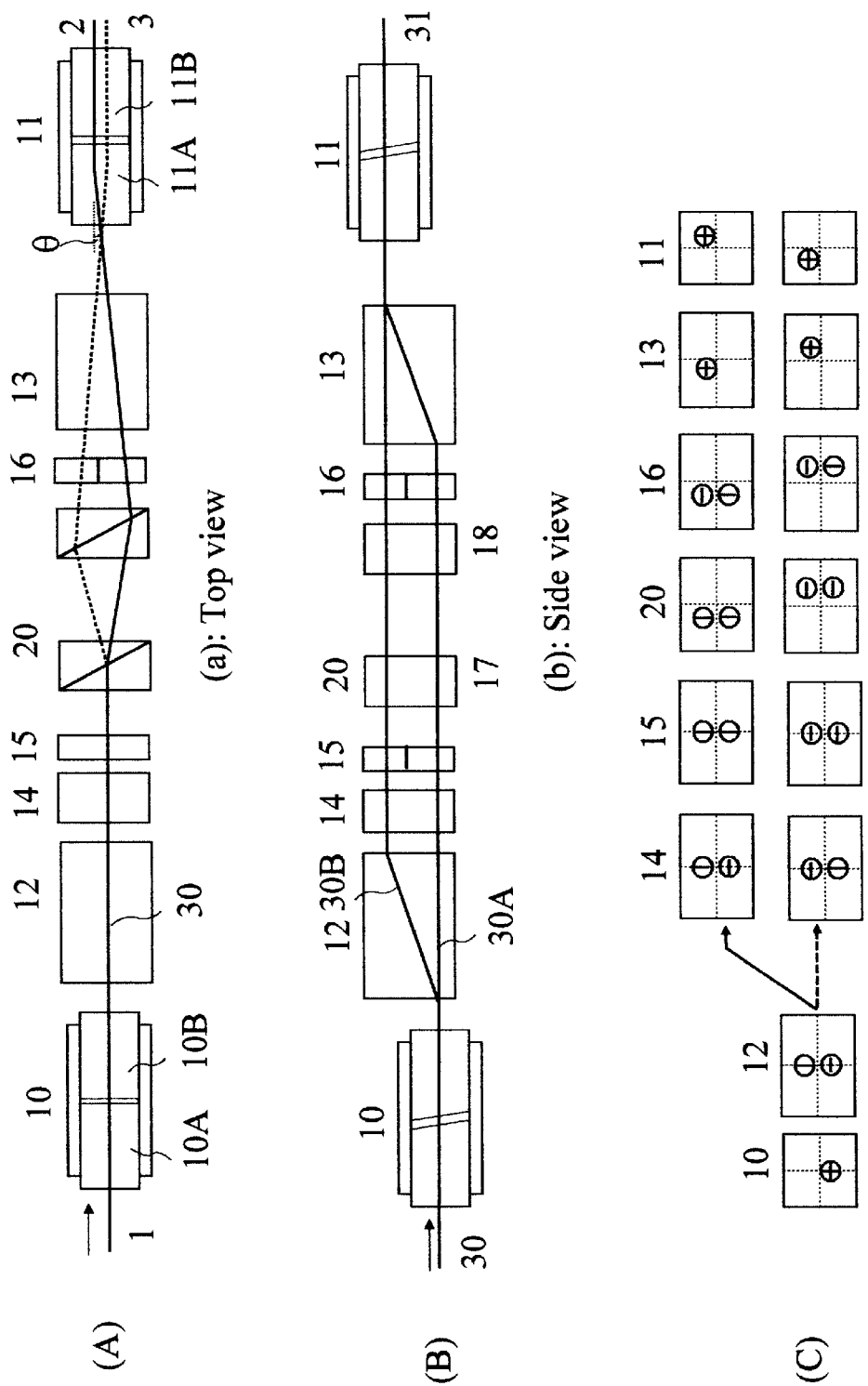
FIG. 5 is a plan view of another specific non-mechanical optical switch of FIG. 2, and illustrates the arrangement of each element within the switch body for this 1×2 embodiment.
Figure 6:
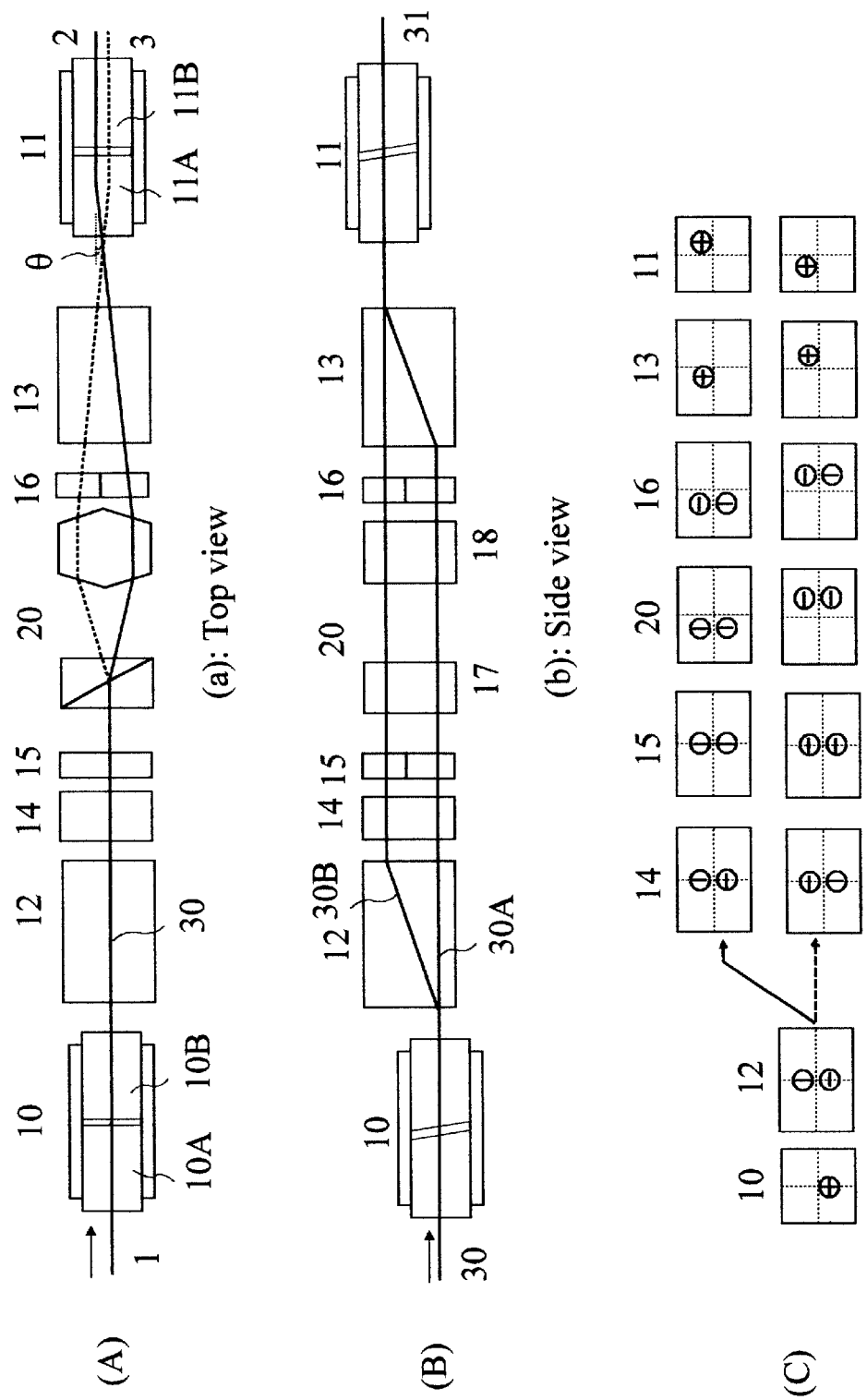
FIG. 6 is a plan view of another specific non-mechanical optical switch of FIG. 2, and illustrates the arrangement of each element within the switch body for this 1×2 embodiment.

Further, with this type of double birefringent plates based element, it is also possible to eliminate walk-off element 17. Two such specific embodiments are illustrated in FIG. 5 and FIG. 6 to teach the art. Various other variations of the arrangements can also perform the same function. An additional Wollaston can replace the walk-off crystal 17 in the above designs as shown in FIG. 4. The second Wollaston is designed to provide receiving angle from light beam with incident angle from the first Wollaston. A glass prism can replace the second Wollaston also as shown in FIG. 6.

Birefringent elements 12, 17, 13, 18A, and 18B can be made of any birefrigent material, such as rutile, calcite, or yttrium orthovanadate.

The above-described magneto-optic effect based optical switch embodiments can be changed into electro-optic effect based switches. This switch embodiments use an electrically controllable birefringent plate rotating polarization from between 0° and 90°, instead of Faraday polarization rotation plate. The inventive electro-optic switch is a reciprocal device, allowing bi-directional optical communication. One embodiment requires only replacing the Faraday rotator 14 with an electro-optic plate having electrical field applied 45° to the X direction. Other embodiments using electro-optic plates with field applied parallel to the X or Y directions are straightforward modifications to the magneto-optic versions with corresponding changes to the orientations of associated birefringent crystals.

The general requirement for the electro-optic phase retarder used in the inventive swicthes is that, when a voltage is applied, a phase shift of $\pi$ is produced between the two polarized beams. Preferably, the material has a high electro-optic coefficient to reduce operating voltages to less than 500 volts, good thermal stability, and good transparency at the wavelength of interest, e.g., between 1200 nm and 1600 nm. These requirements are satisfied by a class of ferroelectric complex oxides which have a Curie temperature less than about 600° C., so that electro-optic coefficients are high in the operation temperature range. Example material systems are: lead niobate zirconate (PNZ), lead manganese niobate (PMN), lanthanum modified PZT (PLZT), and a solid solution of lead manganese niobate and lead tantalate (PMN-PT). More members of this class may be discovered in the future. It is particularly preferable to use single-crystal of the said class of ferroelectric materials, providing good repeatability and temperature independent operation.

The above descriptions of the 1×2 embodiments are very specific examples. It will be apparent to a person of average skill in the art that many variations of the switch are possible within the scope of the invention. Accordingly, the scope of the invention should be determined by the following claims and their legal equivalents.

What is claimed is:

1. A reciprocal Faraday rotator assembly comprising:

a) a first thin plate Faraday rotator formed of an optically transparent magnetic material and arranged for passing light beams along a path in a direction perpendicular to said thin plate Faraday rotator;

b) means for applying a magnetic field in said light beam direction to said first thin plate Faraday rotator, whereby the angle of polarization rotation of said first thin plate Faraday rotator is reversed by reversing the direction of the magnetic field;

c) a second thin plate Faraday rotator located along said beam path and formed of an optically transparent magnetic material and arranged for passing said light beams in a direction perpendicular to said second thin plate Faraday rotator, wherein the magnetization of said second thin plate Faraday rotator is maintained in a saturation state along said beam direction.

2. A Faraday rotator assembly according to claim 1, wherein said first thin plate Faraday rotator is selected from a class of garnet materials characterized by having a saturation field of less than about 500 Oe.

3. A Faraday rotator assembly according to claim 1, wherein said first thin plate Faraday rotator is a 45° Faraday rotator.

4. A Faraday rotator assembly according to claim 1, wherein said magnetic field applying means is formed by a coil and an electromagnet formed of semi-hard magnetic material.

5. A Faraday rotator assembly according to claim 1, wherein said second thin plate Faraday rotator is a 45° Faraday rotator.

6. A Faraday rotator assembly according to claim 1, wherein said second thin plate Faraday rotator comprises a latching garnet plate.

7. A Faraday rotator assembly according to claim 1, wherein said second thin plate Faraday rotator comprises a garnet plate and a permanent magnet.

* * * * *